April 28, 1925. 1,535,832
J. C. HANSEN-ELLEHAMMER
COUPLING ARRANGEMENT BETWEEN A PUMP AND AN AUTOMOBILE
Original Filed April 12, 1923

Patented Apr. 28, 1925.

1,535,832

UNITED STATES PATENT OFFICE.

JACOB CHRISTIAN HANSEN-ELLEHAMMER, OF HELLERUP, DENMARK.

COUPLING ARRANGEMENT BETWEEN A PUMP AND AN AUTOMOBILE.

Original application filed April 12, 1923, Serial No. 631,563. Divided and this application filed February 23, 1924. Serial No. 694,581.

*To all whom it may concern:*

Be it known that I, JACOB CHRISTIAN HANSEN-ELLEHAMMER, subject of the King of Denmark, residing at Hellerup, Denmark, have invented certain new and useful Improvements in Coupling Arrangements Between a Pump and an Automobile, of which the following is a specification.

The present invention comprises a coupling arrangement between the automobile and a pump for driving the latter from the rear wheel of the former. The coupling arrangement adapted for the purpose of driving the pump from an automobile consists therein that either one or both of the rear wheels of the automobile are simultaneously with being coupled also lifted from the ground and that the car is locked in its position by the weight of the driven machine so that jacks and blocking wedges become unnecessary.

The invention will be more fully described hereinafter, an embodiment thereof pointed out in the drawings, and the invention finally pointed out in the claims.

In the accompanying drawing.

Figure 1:
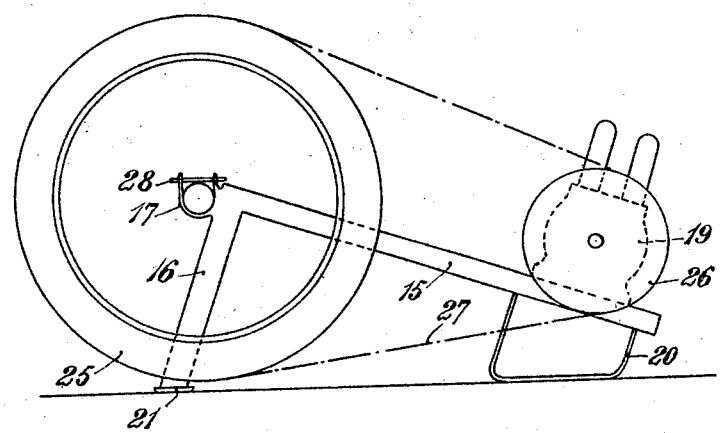
Fig. 1 is a side view of a constructional form of the improved coupling arrangement between the pump and the rear wheel of an automobile.
Figure 2:
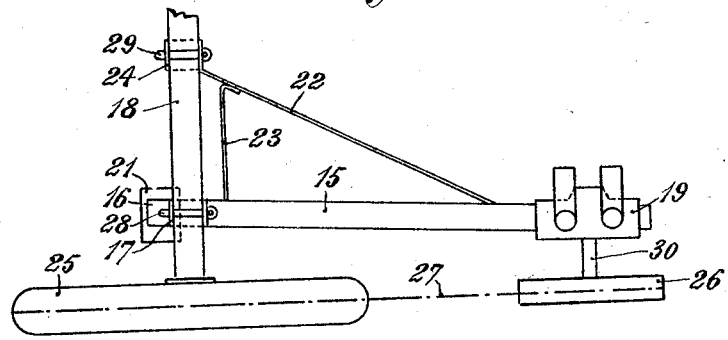
Fig. 2 is a plan view of the coupling arrangement shown in Fig. 1.

According to the constructional form of the invention shown in Figs. 1 and 2 the one of the rear wheels of the automobile is lifted by a bell crank lever which can be made to grip around the rear axle of the automobile, the one arm of the lever bearing against the ground close to the point of contact between the respective rear wheel to be lifted and the ground, whilst the other arm on the one hand bears the machine to be driven and on the other hand serves to receive the pressure by which the car is lifted.

In the drawing 15, 16 the said bell crank lever is provided with a bearing 17 in which rests the rear axle 18 of the automobile.

To the arm 15 of this lever is fitted the pump 19 of any suitable kind, but preferably one made in accordance with my invention as described in my copending application filed Apr. 12, 1923, Serial #631,563, now Patent No. 1,492,456, dated April 29, 1924, of which this application is a division with a base 20.

To the other arm 16 is fitted a base plate 21.

22 and 23 are rods which form a frame in a plane at right angles to the plane of the lever 15, 16. To this frame is fitted a bearing 24 corresponding to the bearing 17. The rear wheel 25 of the automobile and the belt pulley 26 of the pump are coupled by means of a bolt 27.

The manner in which the arrangement acts will now be readily understood.

When the pump is to be coupled to the driving engine, the bearing 17 is placed under the rear axle whilst at the same time the bearing 24 engages the latter, whereupon a downward pressure is exerted on the arm 15 of the lever. The one rear wheel of the automobile will thereby be lifted and the base plate 21 crosses the perpendicular line through the center of the said rear wheel so that the several parts will assume the stable position shown in Fig. 3 of the drawing.

The arrangement described affords the advantage that it is easily operated and that the distance between the driving and the driven wheel remains the same, being determined by the lever 15, 16.

The arrangement having been completed the support of the rear axle in the bearings can be secured by means of split pins 28 and 29.

In a modified constructional form both rear wheels of the automobile may be lifted, each of these wheels being lifted by a separate lever to which a shaft extending transversely beneath the car may be fitted, corresponding to shaft 30, Fig. 4, and to which two belt pulleys 26 are fitted, each driven from one of the rear wheels. This transverse shaft may then be employed for driving the pump.

I have described an embodiment of my invention, but changes can be made therein without departing from the spirit of my invention as defined in the appended claims.

I claim:

1. Coupling arrangement between a pump and automobile, consisting of a pump and a lever, said lever having one arm with which the rear end of the automobile is lifted and supported with one or both rear wheels in an elevated position, and the second arm of the lever having the pump supportingly mounted upon it, whereby the weight of the pump acting on said arm of the lever will lock the automobile in an elevated stationary position.

2. Coupling arrangement between a pump and the rear wheel of an automobile, consisting of a bell crank lever, comprising a supporting arm and a lifting and locking arm, adapted to pivot on the rear axle of an automobile, the one arm of said lever arranged to bear against the ground close to the point of contact between the said rear wheel to be lifted and the ground, a pump on the other arm, said other arm serving to receive the lifting pressure.

3. Coupling arrangement between a pump and a rear wheel of an automobile, consisting of a bell crank lever, comprising a supporting arm and a lifting and locking arm, a bearing at the fulcrum of the said double armed lever adapted to receive the rear axle of the automobile, the one arm of said lever arranged to bear against the ground close to the point of contact between the said rear wheel to be lifted and the ground, a pump on the other arm, said arm serving to receive the lifting pressure, and a frame at right angles to the plane of the said lever, attached to said frame a bearing adapted to receive and support the rear axle of the automobile.

4. Coupling arrangement between a pump and a shaft to be driven from the rear wheels of the automobile, consisting of two bell crank levers, each comprising a supporting arm and a lifting and locking arm, bearings at the fulcrums of the said levers adapted to receive the rear axle of the automobile, the one arm of each said levers arranged to bear against the ground close to the point of contact between the respective rear wheel to be lifted and the ground, the other arms adapted to receive the lifting pressure and adapted to bear a pump or shaft to be driven, separate pulleys fitted to a common shaft running in bearings on these arms being provided to be driven by each of the said rear wheels.

5. In a coupling arrangement between a pump and an automobile, the combination of a pump, a wheel supporting axle of the automobile, means for supporting the pump and the axle of the automobile, and means joining the pump and one of the wheels of said axle for driving the pump by said wheel with the means supporting the said axle and said pump, the weight of the pump on said last named means holding the automobile in a stationary position.

In testimony whereof I affix my signature.

JACOB CHRISTIAN HANSEN-ELLEHAMMER.